M. A. DARVILLE.
CALCULATION CHART FOR SECURITIES.
APPLICATION FILED MAY 2, 1921.

1,413,973.

Patented Apr. 25, 1922.
2 SHEETS—SHEET 1.

INVENTOR.
BY
ATTORNEYS.

M. A. DARVILLE.
CALCULATION CHART FOR SECURITIES.
APPLICATION FILED MAY 2, 1921.

1,413,973.

Patented Apr. 25, 1922.
2 SHEETS—SHEET 2.

INVENTOR.
BY
ATTORNEYS.

UNITED STATES PATENT OFFICE.

MERTON A. DARVILLE, OF ELMHURST, NEW YORK, ASSIGNOR OF ONE-HALF TO DAVID C. JOHNSON, OF NEW YORK, N. Y.

CALCULATION CHART FOR SECURITIES.

1,413,973.          Specification of Letters Patent.          Patented Apr. 25, 1922.

Application filed May 2, 1921. Serial No. 466,277.

*To all whom it may concern:*

Be it known that I, MERTON ARTHUR DARVILLE, a citizen of the United States, residing in Elmhurst, county of Queens, and State of New York, have invented certain new and useful Improvements in Calculation Charts for Securities, of which the following is a specification.

This invention relates to calculation charts and is particularly concerned with charts for use in connection with bonds, stocks or other securities, so arranged that when the values of certain factors or characteristics of such instruments are known, the values of certain unknown factors or characteristics may be determined.

For sake of facility in explaining the invention, reference will be had in the following description thereof to a chart designed especially for use in connection with bonds and stocks, but it is to be expressly understood that the invention is not thus limited in scope, it being applicable in its broad principles to many other uses, as will be readily understood by those versed in the art.

When about to purchase a bond, the usual question that confronts the prospective buyer is, what the yield or net return of the bond will be, if purchased at a specified price, and interest is paid thereon at the face or coupon rate until maturity, at which time the bond will be paid at its face or par value. The manner in which the above factors cooperate to govern the yield rate of a bond is expressed mathematically by the following well known and generally accepted equation:

$$P = 1 + \left(\frac{c-i}{i}\right)\left(1 - \frac{1}{(1+i)^n}\right) \quad (1)$$

in which:

$P$ = purchase or market price of the bond;
$c$ = coupon rate or face interest rate of the bond for the period between coupon payment dates;
$n$ = number of coupon payment periods from date of purchase to maturity of bond;
$i$ = yield rate or net periodical return of the bond if held to maturity or for $n$ number of periods.

The price, therefore, which should be paid for a bond, in order to realize a given yield, may be calculated by formula (1). The results of such calculations for certain values of the quantities, within a limited range, have been listed in so-called bond basis books or tables in which the prices, calculated to many decimal places, for different half-year maturities, are listed opposite given yields.

However, the large number of cases which arise in practice are concerned with a reverse operation,—i. e., ascertainment of what the yield will be if the bond is bought at a given market price. Formula (1), however, cannot be readily solved for $i$, since this factor can be evaluated only by successive approximations (except when the value of $n$ is small) from the following equation, derived from (1):

$$i = \frac{c + \dfrac{i(1-P)}{(1+i)^n - 1}}{P} \quad (2)$$

This formula is given and its manner of derivation is explained in several well-known books relating to investments, as for example, on page 122 of the text-book by C. E. Sprague on "Accountancy of Investment", edition of 1914 published by The Ronald Press, New York city.

In this formula $i$ is not only present on both sides, but occurs raised to the $n$th power, and since the value of $n$ is often very high, according to the number of periods until maturity, this formula is incapable of direct, accurate solution (except when the value of $n$ is small).

It has, consequently, been customary heretofore to use tables covering many hundreds of pages, calculated in accordance with formula (1), these tables in most cases being used inversely in order to ascertain the yield corresponding to any given market price. However, it would seldom occur that there was listed in the tables either the given market price (these prices having been calculated for certain given yields as above described) or the given maturity (since only even half-year maturities are shown). It was necessary, therefore, to go through a process of calculation or interpolation to ascertain the actual yield. These tables, therefore, to be capable of results which are accurate usually require the expenditure of considerable effort and time.

The present invention has for one of its objects the elimination of such calculations or interpolations, providing as it does a chart whereby an accurate solution of a problem of the above-described character may be speedily obtained. The chart is so constructed, in fact, that any one of the factors involved in the above formulæ may be quickly ascertained if the others thereof are known.

A good understanding of the invention may now be had from the following description of one form of embodiment thereof, reference being had to the accompanying drawing, in which.

Similar characters of reference designate similar parts in each the two views.

Figure 1:
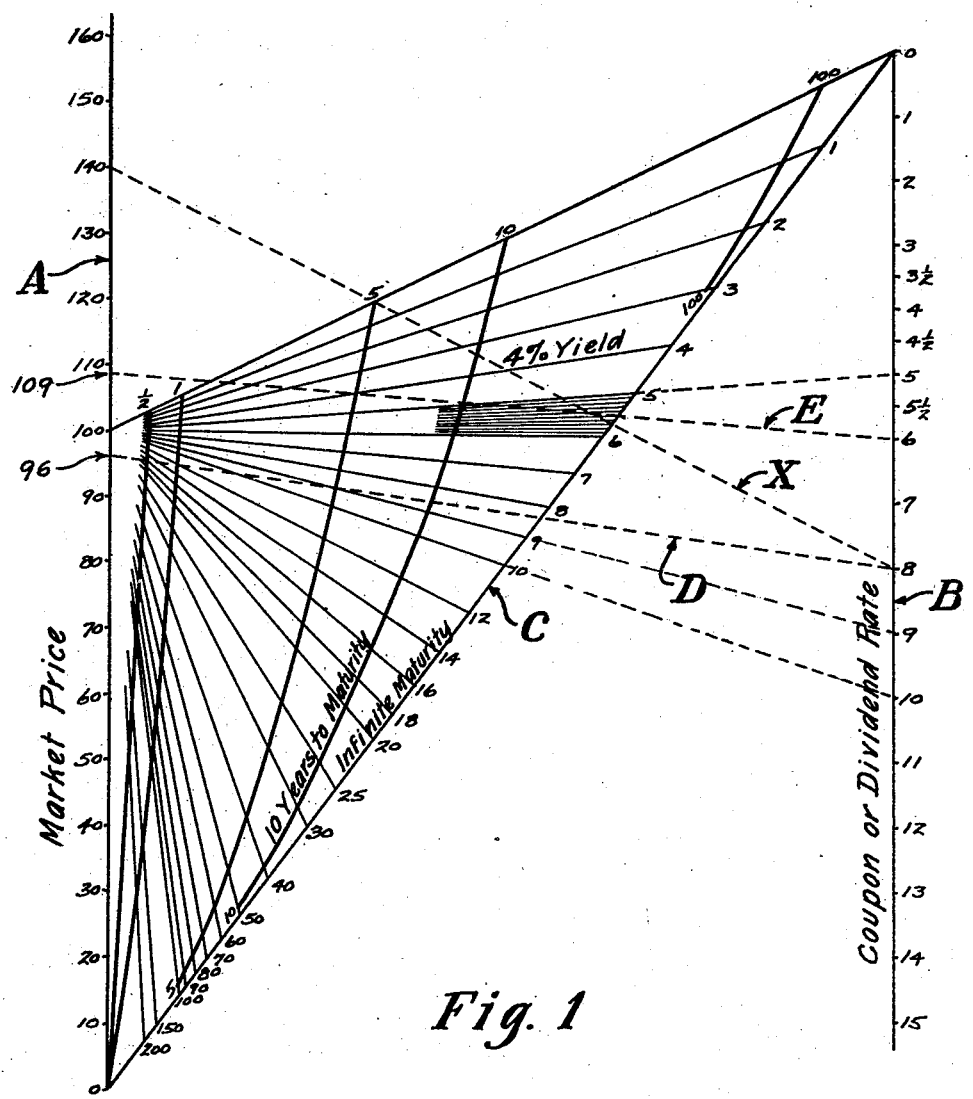
Fig. 1 illustrates one form of chart embodying the invention.

In Fig. 1, reference character A designates a conveniently chosen scale of market prices of bonds whose face values are 100. This scale comprises values from zero to 160, and embraces, therefore, almost every conceivable market condition, although the scale may be extended even beyond this value, if desired. B is a scale parallel to A and is arbitrarily graduated in coupon rates expressed in percent of face value. This scale covers positive rates up to 15 percent, but it too may be extended in either direction, if desired.

From the hundred mark of scale A radiate a number of lines which represent yields, these lines being drawn from the said mark of par or face value to the various divisions of scale B and denoted by the same figures as the said divisions. For example, the line which extends from 100 of A to 5 of B (as indicated by the dotted extension of the line) is denoted by the figure 5; similar extensions are shown for the lines marked 9 and 10. These radial lines represent yields and radiate from the par value mark because the yield of a bond purchased at par is always the same as the coupon rate thereof. For example, a bond, which has a coupon rate of five percent, bought at par and payable at par, has a yield of five percent. The above-mentioned yield lines are intersected by maturity lines which originate at the zero point of the scale A and denote, in the present instance, the number of years to maturity of the security. These lines, with the exception of the one-half year and infinity year lines, are slightly curved and their points of intersection with the yield lines are calculated from equation (1), hereinabove mentioned. The five-year maturity line, for example, may be found as follows: Assume, for instance, that a security has a coupon rate of 8% but a yield rate of 9%, the period to maturity being five years. These values are substituted in equation (1) and the same is solved for P, the value of which, in the present case, will be found to be approximately 96. A line D is then drawn from the value 8 of scale B to the value 96 of scale A, and the point of intersection of this line with the 9% yield line constitutes one point of the five-year maturity line. Other points on this line are found by assuming other values for coupon and yield rates and solving equation (1) accordingly. It will thus be seen that a maturity line represents the locus of points of intersection of the yield lines of any security whose period of time to maturity corresponds to the said maturity line, with lines connecting the actual market price of the security with its coupon rate. The reason the one-half year line is straight, it may here be noted, is because the chart is calculated for bonds of which the coupons are payable semi-annually, this being the coupon period most universally employed. The chart may, of course, be constructed for any desired coupon payment period. For an infinite number of years to maturity,—in other words, if the principal is never to be repaid, such as in the case of a stock or non-maturing security,—the maturity line is straight and extends between the zero marks of the two scales, as indicated by C. The intersections of the radial yield lines with line C designate in this case the yearly cash return (payable semi-annually) on the investment. If, for example, an 8% stock sells at par, the cash return is 8%; but if it sells at less than par, say 96, its cash return is greater than 8%, being the quotient of 8 divided by 96, or $8\frac{1}{3}\%$. This may be found in the diagram by drawing a line D from the 96 value of scale A to the 8 mark on B, or placing a straight edge in this position and noting the intersection with scale C, which in the present instance is $8\frac{1}{3}\%$, the accuracy depending on the size and scale of the chart. The annual cash return on a bond is ascertained in the same way.

If the period to maturity is less than infinity, the yield of a bond selling at a discount is greater than the cash return and may be found at the intersection of the corresponding maturity line with the line connecting the market price and coupon rate. In the present example, if the period to maturity is 10 years, the yield is about 8.6%, as read at the intersection of line D with the 10-year line; and if the maturity period is 5 years, the yield is about 9%. The yield may thus be determined in any particular case by placing the left end of a straight edge on the market price scale A, the right end on the coupon rate scale B, and reading the yield at the intersection of the straight edge with the corresponding maturity line.

Conversely, to ascertain the market price at which any bond should be purchased, in order to give a desired yield, the straight edge, placed with the right end on the coupon rate and passing through the intersection of the known maturity and yield lines, will give the market price, at the intersection with scale A. If, for example, it is desired to obtain a yield of 4 percent on a bond maturing in 5 years and having a coupon rate of 6 percent, the straight edge is placed on the line E and the market price is read at the intersection of this line with scale A. In the present instance, this price is approximately 109.

The chart may be used in a corresponding manner to determine the number of years to maturity or the coupon rate, knowing in each case the three other factors.

It may here be noted that in constructing the diagram the point of intersection of any maturity line with the line of zero yield may readily be checked in the manner indicated by line X, Fig. 1. If a bond has a coupon rate of, say, 8 percent and has a period to maturity of 5 years, then, in order to produce no yield, it must sell at 100 plus 8×5=140. In other words, the 5-year maturity line must pass through the intersection of the zero yield line with line X, as illustrated. A rapid check may thus be made for any desired number of intersections on the zero yield line.

It should be noted that, although the illustrated chart is necessarily drawn to a small scale, charts intended for actual use may be constructed in far larger proportions, so that the results may be read off with a high degree of accuracy. On charts intended for practical use, the sub-divisions of yields, maturities, etc., will be indicated by additional lines, as illustrated in Fig. 1, for example, between the five and six percent yield lines. It will also be understood, of course, that the scale of prices may be in terms of any desired monetary system.

Figure 2:
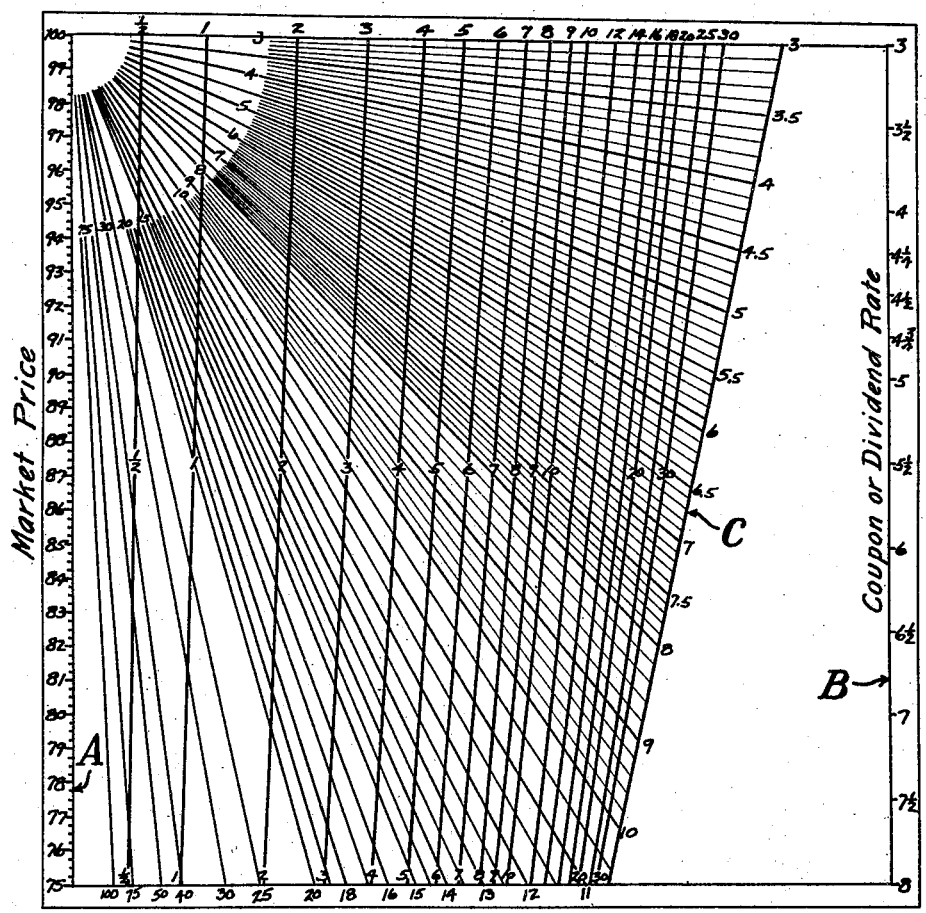
Fig. 2 shows a chart similar to that of Fig. 1 on a magnified scale.

Figure 2 illustrates a chart similar to that of Fig. 1, but drawn to a somewhat enlarged scale. This diagram, it will be observed, covers only a range of coupon rates from 3 to 8% and market prices from 75 to 100. Any desired part of the complete diagram may thus be laid out as a separate chart, as will be readily understood.

While I have illustrated and described my invention in connection with only a few embodiments thereof, it will be understood that I do not intend to limit myself to the specific embodiments shown, but that I intend to cover my invention broadly in whatever form its principle may be employed.

What is claimed is:

1. A chart of the character described, said chart comprising a series of marks constituting a scale of market prices, a series of marks constituting a scale of coupon rates, a series of lines radiating from a point of said scale of market prices toward the divisions of the scale of coupon rates, said point representing par value of the security, and said lines being marked to represent the yield of the security, and a plurality of lines intersecting said radial lines, said lines representing the period of time to maturity of the security.

2. In a chart of the character described, comprising a series of marks constituting a scale of market prices, a series of marks constituting a scale of coupon rates and a plurality of maturity lines placed between said scales, each of said maturity lines being the locus of the points of intersection of pairs of lines connecting, respectively, the market price of a security with its coupon rate, and the par value of the security with its rate of actual yield when its maturity corresponds to the said line.

3. A chart of the character described, comprising a series of marks constituting a scale of market prices, a series of marks constituting a scale of coupon rates, said scales being parallel to each other and conveniently graduated in divisions of uniform lengths, respectively, a series of lines radiating from a point of said scale of market prices, said point representing par value or price to be paid at maturity and said lines connecting said point of par value with the divisions of the scale of coupon rates, said lines being marked to represent the yield of the security, and a plurality of lines originating at the zero point of the scale of market prices and being so drawn as to intersect the radial lines at points representing periods of time to maturity of the security.

4. A chart of the character described, a plurality of a series of marks constituting scales representing market prices and interest rate, respectively, a line connecting the zero values of said scales, said line being graduated to give the cash return of an investment at any given market price of a security having any given interest rate payable on the face or par value of the security.

5. A chart of the character described, comprising a series of marks constituting a first scale, a series of marks constituting a second scale parallel to said first scale, the divisions of each scale being chosen of convenient and equal lengths, a series of marks constituting a third scale uniting the zero values of the first and second scales, the divisions of said third scale being formed by lines radiating from a chosen value of said first scale and extending toward the divisions of the second scale.

6. A chart of the character described, comprising a series of marks constituting a scale of market prices, a series of marks constituting a scale of coupon rates, said scales being parallel to each other and conveniently graduated in divisions of uniform lengths, respectively, and a plurality of lines originating at the zero point of the scale of market prices and being so drawn as to intersect any line drawn from the par value mark of the scale of market prices to the scale of coupon rates at points representing periods of time to maturity of the security.

In testimony whereof I have affixed my signature to this specification.

MERTON A. DARVILLE.